US006032785A

United States Patent [19]

Beall, Jr.

[11] Patent Number: 6,032,785

[45] Date of Patent: Mar. 7, 2000

[54] OVERHEAD CONVEYOR SYSTEM

[75] Inventor: Thomas E. Beall, Jr., Wye Mills, Md.

[73] Assignee: OCS-IntelliTrak, Inc., Cincinnati, Ohio

[21] Appl. No.: 09/093,311

[22] Filed: Jun. 9, 1998

[51] Int. Cl.[7] .................... B65G 29/00

[52] U.S. Cl. .................... 198/465.4; 198/687.1; 104/166

[58] Field of Search .................... 198/465.4, 687.1; 104/166

[56] References Cited

U.S. PATENT DOCUMENTS

| | | | |
|---|---|---|---|
| 3,164,104 | 1/1965 | Hunt . | |
| 3,850,280 | 11/1974 | Ohrnell . | |
| 4,203,511 | 5/1980 | Uhing . | |
| 5,785,168 | 7/1998 | Beall | 198/465.4 |

FOREIGN PATENT DOCUMENTS

| | | | |
|---|---|---|---|
| 714323 | 7/1965 | Canada | 104/166 |

*Primary Examiner*—Jospeh E. Valenza
*Attorney, Agent, or Firm*—Beall Law Offices

[57] ABSTRACT

With respect to an overhead conveyor of the type wherein a carriage travels along a rotatable generally horizontal drive shaft by being supported on the top periphery of the drive shaft through skewed driven rollers, carriage construction is minimized by forming a portion or all of the carriage from a uniform cross sectional shaped elongated member extending through skewed apertures within the hub of one or all of the driven rollers.

20 Claims, 5 Drawing Sheets

XII
XII
48
28
29
29
53
19
15
2
3
16
16
24
8
12
14
13
4
18
17
VI
VI
22
20
23
21
30
9
9
27
26
31
10
10

OVERHEAD CONVEYOR SYSTEM

BACKGROUND OF THE INVENTION

The present invention relates to an overhead conveyor system of the type that has load carrying carriages that are supported on skewed driven wheels engaging a rotatable shaft.

Overhead conveyors of the above type are represented by U.S. Pat. No. 4,203,511, issued May 20, 1980 to Uhing, U.S. Pat. No. 3,164,104, issued Jan. 5, 1965 to Hunt, and U.S. Pat. No. 3,850,280, issued Nov. 26, 1974 to Ohrnell. By reference, the disclosure of these U.S. patents is incorporated herein in their entirety as a disclosure of environments in which the present invention may be used, operating principals, and the noncarriage portion of the overhead conveyor, e.g. the drive shaft, bearings, drive motor and transmission.

This type of overhead conveyor has many advantages over less expensive overhead conveyors, such as those that employ chains, with such advantages including: cleanliness, quietness, conveying speed changes throughout the system, less maintenance, and greater flexibility in moving the carriages between individual conveyors, buffers and the like throughout the system. However, the overhead conveyor of the present invention type has a disadvantage of generally being more expensive than the chain type conveyor in initial cost, and a large part of this cost is the complexity of the carriage. The conveyor system may employ hundreds of carriages.

SUMMARY OF THE INVENTION

It is an object of the present invention to reduce the initial cost, without adversely affecting the advantages, of an overhead conveyor of the type wherein loads are suspended on carriages that are supported by skewed driven wheels engaging a rotatable drive shaft, with the carriage cost being reduced by mounting the driven wheels on fixed shafts (fixed with respect to the carriage), each fixed shaft passing through a skewed aperture in the hub of a corresponding one of the driven rollers.

BRIEF DESCRIPTION OF THE DRAWINGS

Further objects, features and advantages of the present invention will become more clear from the following detailed description of a preferred embodiment, shown in the accompanying drawing, wherein.

DETAILED DESCRIPTION OF THE PREFERRED EMBODIMENT

Figure 1:
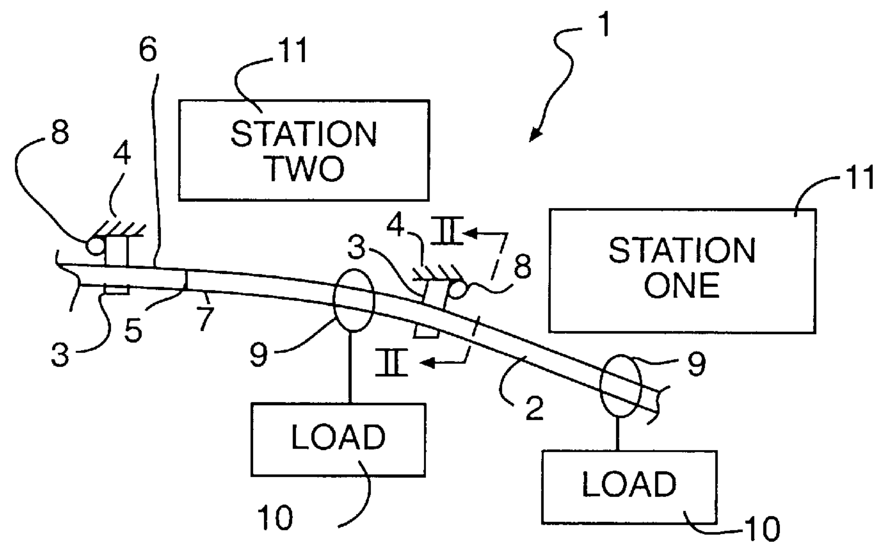
FIG. 1 shows, on a reduced scale, a conveyor system for transporting loads between stations.

In FIG. 1 the conveyor system 1 employs a rotatable drive shaft 2 that is mounted by means of bearing supports 3 to a stationary support 4, so that the drive shaft 2 may rotate about its elongated axis, but without moving axially. The drive shaft 2 may be of any length, and may be split at a rotatable coupling 5 so as to provide a first portion 6 that will rotate at one speed and a second portion 7 that will rotate at a different second speed. For each of the drive shaft portions 6 and 7, there is at least one drive 8 to rotatably drive the corresponding drive shaft portion.

A plurality of carriages 9 are supported on the drive shaft 2 to be driven longitudinally of the drive shaft 2. Each of the carriages 9 supports a load 10, so as to move the loads 10 between the various stations 11, which stations may be: loading/unloading stations; order picking or order distributing stations; work stations such as a fabric sewing station, spray paint station or assembly station; and treatment stations, such as an oven station or a fabric drying station.

Figure 2:
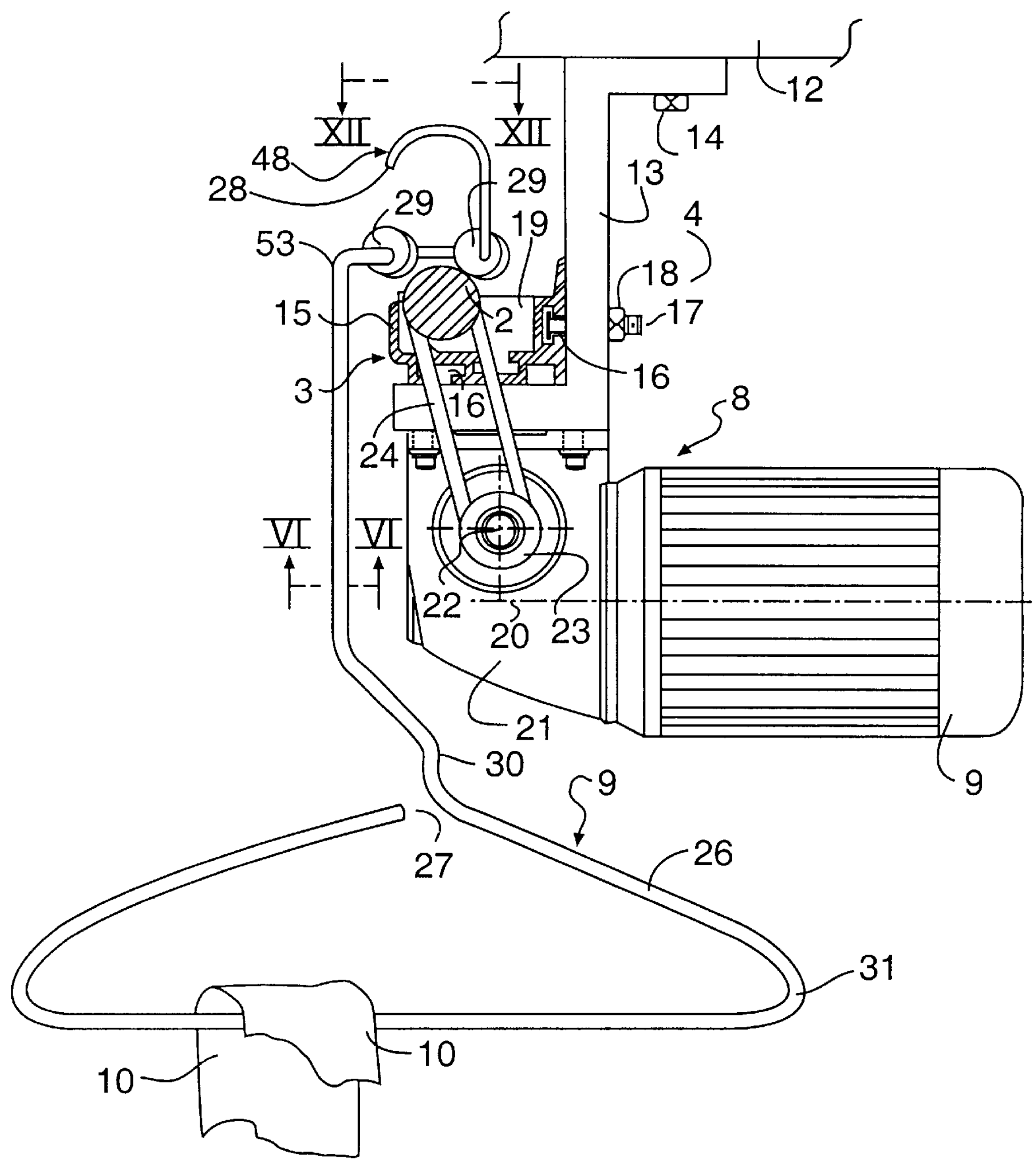
FIG. 2 is a cross sectional view taken along line II—II of FIG. 1.

FIG. 2 is a side elevational view taken along line II—II of FIG. 1, on a scale enlarged with respect to FIG. 1, so as to show greater details and a representative load 10 being carried by a carriage 9. The carriage 9 is supported on the drive shaft 2, which drive shaft 2 is rotatably supported by the bearing supports 3 on the stationary support 4 and rotatably driven by the drive 8.

In greater detail, the stationary support 4 includes a rigid cross beam or ceiling 12, a Z-shaped frame member 13 bolted at 14 to the ceiling or cross beam 12. The bearing support 3 includes an upwardly opening channel 15, which may be extruded aluminum of uniform cross sectional shape throughout its length. The channel 15 will extend throughout substantially the entire length of the drive shaft 2, except for the passage of certain elements such as a drive transmission member, for example belt 24, to be described later. The channel 15 has a plurality of T-slots 16 to secure a T bolt 17 that is in turn secured by a nut 18 for mounting the channel 15 on the Z-shaped frame member 13. A bearing block 19 provides a rotatable and axially fixed mounting of the shaft 2 within the channel 15. The bearing block 19 is preferably of the type that includes permanent sealed lubrication, and it is of a known standard construction.

The drive 8 includes a motor having a rotatable output shaft (not shown) on its left side in FIG. 2, which delivers rotational power along the axis 20 to a transmission 21, which may be a standard worm drive transmission with sealed lubrication, which transmission delivers power at reduced speed and increased torque to an output shaft 22 that is rotatable about an axis perpendicular to the axis 20 and which carries V pulley 23. The pulley 23 receives and drives the drive transmission member or V-belt 24 to deliver the driving power to the shaft 2 by means of a V-shaped slot within the outer periphery of the drive shaft 2, which receives therein the V-belt 24.

The carriage 9 has a single uniform elongated member 26 having one distal end 27 and an opposite distal end 28. The elongated member 26 is of uniform cross sectional shape throughout its entire length, except for distortion due to bending of the elongated member or securing of the elongated member to a driven roller 29. Preferably, the elongated member 26 is rolled or extruded wire, rod or the like made of a suitable material, such as metal. The elongated member 26 is preferably manufactured from a coil or spool of indefinite length stock material, which material is then bent, with or without the application of heat, and cut into the illustrated shape.

Figure 5:
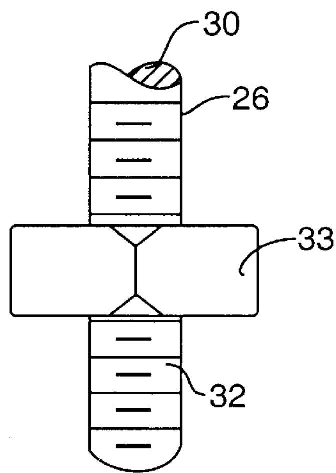
FIG. 5 shows the lower end of a carriage, wherein the upper portion of the carriage is identical to the upper portion of the carriage shown in FIG. 2.

The load carrying portion of the carriage 9 may be considered that portion below the point 30, and may take on the form of a coat hangar shape 31 as in FIG. 2 for supporting finished or unfinished or partially finished fabric material 10 as the load, or may be in the form of a threaded rod 32 (shown in FIG. 5) for receipt of a standard nut 33, for mounting further carriage structure or mounting a load.

Figures 6, 7, 8, 9:
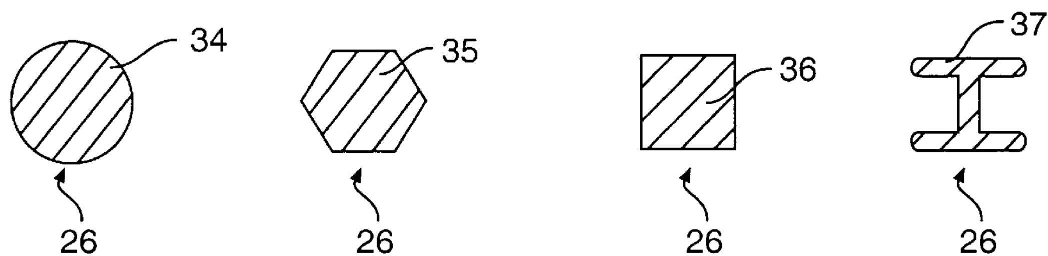
FIG. 6 is an enlarged cross sectional view taken along line VI—VI of FIG. 2.
FIG. 7 is a cross sectional view of another carriage used in the conveyor system that is identical to the carriage shown in FIG. 2, except for the octagonal cross sectional shape of the carriage uniform member and the corresponding cross sectional shape of the skewed aperture in each driven roller.
FIG. 8 is a cross sectional view of another carriage used in the conveyor system that is identical to the carriage shown in FIG. 2, except for the square cross sectional shape of the carriage uniform member and the corresponding cross sectional shape of the skewed aperture in each driven roller.
FIG. 9 a cross sectional view of another carriage used in the conveyor system that is identical to the carriage shown in FIG. 2, except for the I-beam cross sectional shape of the carriage uniform member and the corresponding cross sectional shape of the skewed aperture in each driven roller.

A uniform cross sectional shape of the elongated member 26 may take on many different configurations, for example that of a circle 34 in FIG. 6, an octagon 35 in FIG. 7, a square 36 in FIG. 8 or an I-beam 37 in FIG. 9.

Figure 3:
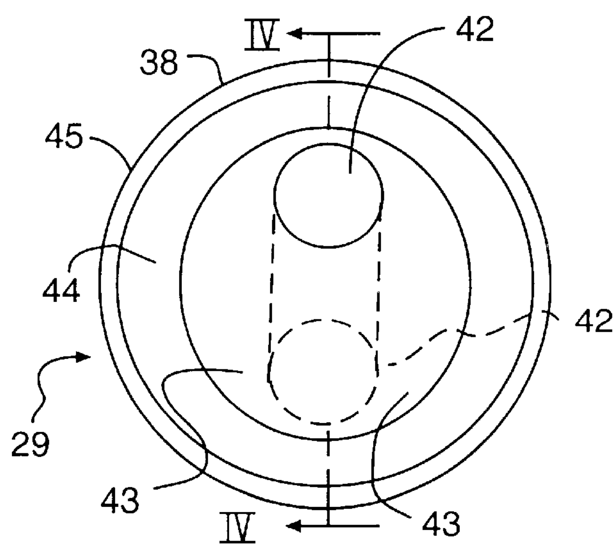
FIG. 3 is an enlarged side elevational view of one of the driven rollers, which is representative of all of the driven rollers.
Figure 4:
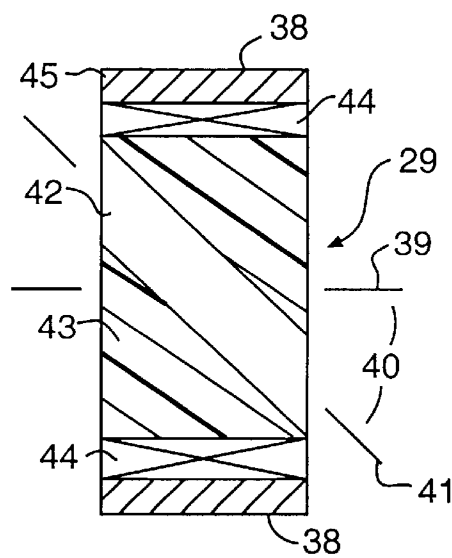
FIG. 4 is a cross sectional view taken along line IV—IV of FIG. 3.
Figure 10:
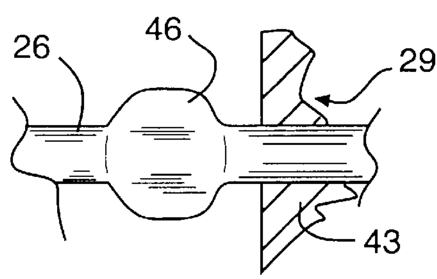
FIG. 10 is a partial cross sectional view through a driven wheel hub showing a swaged connection between the uniform elongated member and the driven roller.
Figure 11:
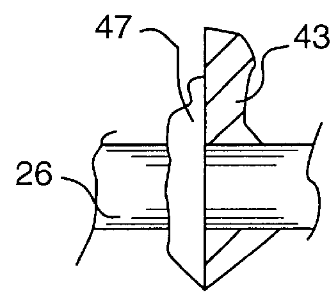
FIG. 11 is a partial cross sectional view showing a bonded connection between the uniform elongated member and the hub of the driven roller.

The rollers 29 are of identical construction and are preferably standard rollers modified only with respect to the aperture within the hub of the roller being skewed. Preferably, the roller 29 is constructed of plastic, although other materials may be employed. Representative details of a roller are shown in FIGS. 3 and 4, wherein an outer cylindrical periphery 38 has a central axis 39, which axis 39 is skewed by an angle 40 with respect to an axis 41 of a through aperture. The aperture 42 passes through the hub 43 and is of an interior cross sectional shape corresponding to the exterior cross sectional shape of the elongated member 26, that is complimentary to the corresponding cross sectional shapes shown in FIGS. 6, 7, 8 and 9, for example. The roller 29 is mounted on the elongated member 26 so that the cylindrical periphery 38 is rotatable when mounted with respect to the elongated member 26, which is accomplished for example by means of the schematically shown bearing 44 between a tire portion 45 and the hub 43. Axial movement of the roller 29 along the elongated member 26 is prevented by swaging of the elongated member 26 at 46 on each side of the driven roller 29, as shown in FIG. 10, for example. With respect to the bearing 44 between the cylindrical periphery 38 and the hub 43, shown in FIG. 4, it is preferable to fixedly secure the hub 43 onto the elongated member 26 by a bonding 47 as shown in FIG. 11, which bonding may be a melting of some of the plastic material of the hub 43, an adhesive, welding, brazing, or the like, which would be applicable to any of the cross sectional shapes represented in FIGS. 6, 7, 8 and 9.

Adjacent the distal end 28 of the elongated member 26, the elongated member 26 is bent into a hook-shape 48 that may be used by a transfer mechanism (conventional but not shown) to remove the carriage 9 from the drive shaft 2 so as to place the carriage 9 on a different drive shaft, as a diverter, or to place the hook 48 on a fixed gravity or drag rail, or a support at a work station.

Figure 17:
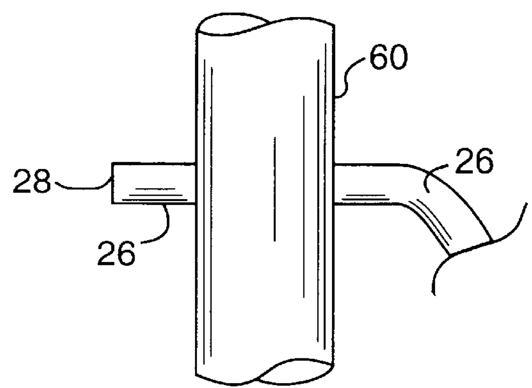
FIG. 17 shows a side elevational view of the top portion of a carriage used within the conveyor system, which carriage is otherwise identical to the carriage shown in FIG. 2.

For others of the carriages 9, the portion of the elongated member 26 adjacent the distal end 28 is horizontal and mounts an auxiliary roller 60 to be used in a known manner by a transfer mechanism for moving carriages to desired locations, or holding carriages at a buffer, or on a gravity or drag rail, for example as shown in FIG. 17. In FIG. 17, the auxiliary roller 60 is rotatably mounted on the elongated member 26 in any of the manners previously described, with the axis of the auxiliary roller 60 shown in FIG. 17 being at right angles to the rotational axis of the drive shaft 2, when the carriage 9 is mounted on the drive shaft 2. The auxiliary roller 60 in FIG. 17 is in a position above, spaced from and out of engagement with the drive shaft 2; that is, FIG. 17 is a view on a plane corresponding to the plane of FIG. 2, that is a side elevational view.

Figure 12:
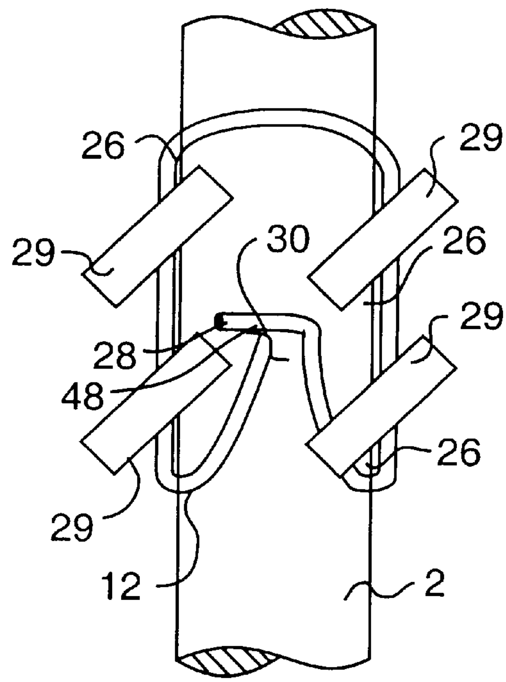
FIG. 12 is an overhead view of a portion of the carriage and drive shaft, taken from line XII—XII of FIG. 2.

FIG. 12 is an overhead view taken along line XII—XII of FIG. 2, showing the carriage 9 above the point 30 and a portion of the drive shaft 2; other portions shown in FIG. 2 being removed for purposes of clarity.

Figure 13:
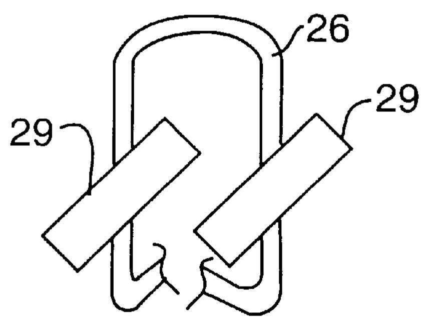
FIG. 13 is a view corresponding to FIG. 12, but of a carriage that is identical to the carriage of FIG. 2, except that it employs only two driven rollers.

FIG. 13 is identical to FIG. 12, but showing the mounting of only two driven rollers 29, instead of the four driven rollers 29 of FIG. 12. For purposes of clarity, the drive shaft 2, the hook portion 48 and the portion adjacent to point 30 of elongated member 26 have been removed in FIG. 13, as compared to FIG. 12.

Figure 14:
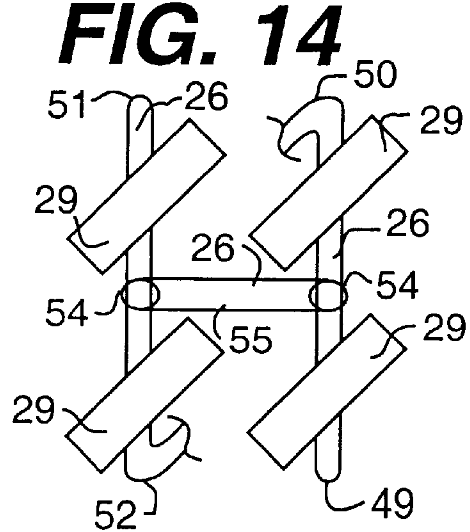
FIG. 14 is a view similar to that of FIG. 12 of a carriage that is identical to the carriage of FIG. 2, except for the illustrated difference in FIG. 14.

FIG. 14 is an overhead view similar to FIG. 12 of a carriage, which in side elevational view would be identical to the carriage shown in FIG. 2. In FIG. 14, the elongated member 26 is composed of three separate homogenous pieces, that is a first piece having a distal end 49 and an adjacent linear portion mounting the driven rollers 29 (with a linear portion having a distal end, the driven rollers 29 may be easily mounted after all of the bending is completed), and a bent portion 50 leading to the hook 48 and distal end 28; a second piece having a distal end 51 and a straight portion adjacent the distal end 51 for mounting the rollers 29 (with a linear portion having a distal end, the rollers 29 may be easily mounted after all of the bending is completed), and a bent portion 52 corresponding to the bent portion 53 of the carriage shown in FIG. 2, leading to the hangar shape and distal end 27; and a third piece being one or more cross brace members that may be of a different cross sectional shape and welded or otherwise bonded at opposite ends 54 to the first and second pieces for providing a substantially rigid support structure for the driven rollers 29. The cross brace members 55 may be provided after the rollers 29 are mounted or may extend between the bent portion 50 and the bent portion 52 so as not to interfere with the mounting of the driven rollers 29.

In each of FIGS. 12 and 14, the structure may be modified by the removal of one of the driven rollers 29.

Figure 15:
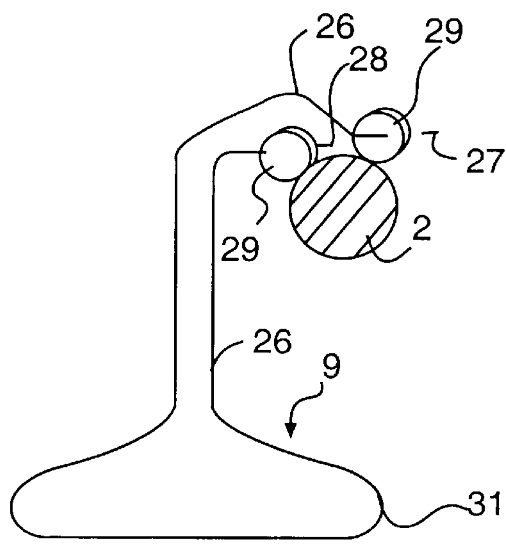
FIG. 15 is a view similar to FIG. 2, but showing a different carriage employing only two driven wheels.
Figure 16:
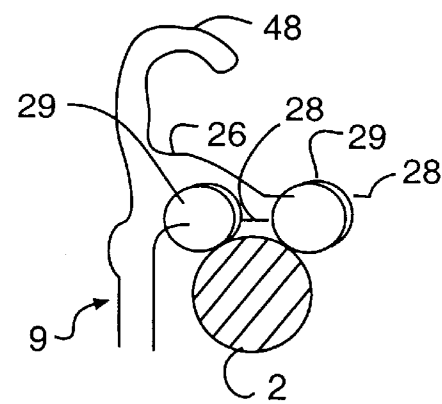
FIG. 16 is a view of a carriage that is identical to the carriage of FIG. 15, except for the addition of a hook at the top of the carriage.

The side elevational views of FIG. 15 and FIG. 16 show modifications in the structure of the bent elongated member 26. In FIG. 15, it is seen that only two driven rollers 29 are employed and mounted on corresponding linear portions of elongated member 26 immediately adjacent respective distal ends 27, 28. In FIG. 16, elongated member 26 is identical to that shown in FIG. 15, except for the upper portion of elongated member 26 extended and bent into the hook 48.

As shown in FIG. 1, the conveyor includes plural carriages 9, and the other figures show different constructions for these carriages that may all be used at the same time on a single conveyor drive shaft.

While a preferred embodiment has been set forth with specific details, further embodiments, modification and variation are contemplated according to the broader aspects of the present invention, all as determined by the spirit and scope of the following claims.

What is claimed is:

1. A conveyor system for moving a plurality of loads along an overhead conveyor between stations, comprising:

a stationary support;

a rotatable elongated drive shaft having a generally cylindrical outer peripheral surface and central axis of symmetry;

bearing supports rotatably mounting and axially fixing said drive shaft with respect to said stationary support;

a drive drivingly connected to said drive shaft for rotating said drive shaft about said central axis of symmetry;

a plurality of carriages engaging said drive shaft for supporting respective ones of the loads;

each of said carriages including at least two driven rollers on opposite sides of and engaging respective upwardly facing peripheral portions of said drive shaft cylindrical outer peripheral surface;

said driven rollers being mounted for rotation about respective axes that are each skewed at an acute angle with respect to said central axis of symmetry of said drive shaft so that as said drive shaft rotates, a loci of contact between each of said driven rollers and said drive shaft is a helical line on said cylindrical outer peripheral surface and said carriages move along said central axis of symmetry in a direction dependent upon the direction of rotation of said drive shaft; and each of said carriages further including an elongated member passing through a corresponding one of each of said driven rollers along an axis that is skewed with respect to the corresponding axis of rotation of the driven roller.

2. A conveyor system according to claim 1, wherein said elongated members are linear and of uniform cross sectional shape throughout their length.

3. A conveyor system according to claim 1, further including a permanently bent elongated member of said uniform cross sectional shape homogeneously interconnecting said elongated members that are linear.

4. A conveyor system according to claim 2, wherein there are only two of said driven rollers.

5. A conveyor system according to claim 2, wherein there are four of said driven rollers.

6. A conveyor system according to claim 2, further including a permanently bent elongated member of uniform cross sectional shape throughout its length formed into a hook at one end and homogeneously connected to said previously mentioned elongated members that are linear; and all of said elongated members having the same uniform cross sectional shape.

7. A conveyor system according to claim 2, further including a permanently bent elongated member formed into a garment hangar extending below said drive shaft and being homogeneously connected to said previously mentioned elongated members, and all of said elongated members being of the same uniform cross sectional shape throughout their length.

8. A conveyor system according to claim 1, wherein said elongated member has a cross sectional shape and said driven roller has a skewed through aperture of a matching cross sectional shape; each of said driven rollers has a rotatable bearing surrounding said aperture for rotatably mounting said driven roller on said elongated member; and further including means for limiting axial movement of said driven roller on said elongated member.

9. A conveyor system according to claim 8, further including a non-circular cross sectional shape for said elongated member and a corresponding cross sectional shape for said aperture.

10. A conveyor system according to claim 8, further including bonding between said elongated member and said driven roller.

11. A conveyor system according to claim 1, wherein each of said driven rollers includes a cylindrical outer peripheral portion for engaging said drive shaft, a central hub having therethrough a skewed aperture, and a rotatable bearing between said hub and said cylindrical outer peripheral portion.

12. A conveyor system according to claim 11, wherein said elongated members are linear and of uniform cross sectional shape throughout their length.

13. A conveyor system according to claim 6, further including an idler roller spaced from said drive shaft and mounted on said hook about an axis of rotation perpendicular to said drive shaft.

14. A conveyor carriage system for moving a plurality of loads along an overhead conveyor having a rotatable elongated drive shaft having a generally cylindrical outer peripheral surface and central axis of symmetry, said carriage comprising:

at least two driven rollers on opposite sides of and engaging respective upwardly facing peripheral portions of said drive shaft cylindrical outer peripheral surface;

said driven rollers being mounted for rotation about respective axes that are each skewed at an acute angle with respect to said central axis of symmetry of said drive shaft so that as said drive shaft rotates, a loci of contact between each of said driven rollers and said drive shaft is a helical line on said cylindrical outer peripheral surface and said carriages move along said central axis of symmetry in a direction dependent upon the direction of rotation of said drive shaft; and further including an elongated member passing through a corresponding one of each of said driven rollers along an axis that is skewed with respect to the corresponding axis of rotation of the driven roller.

15. A carriage according to claim 14, wherein said elongated members are linear and of uniform cross sectional shape throughout their length.

16. A carriage according to claim 14, further including a permanently bent elongated member of said uniform cross sectional shape homogeneously interconnecting said elongated members that are linear.

17. A carriage according to claim 15, further including a permanently bent elongated member of uniform cross sectional shape throughout its length formed into a hook at one end and homogeneously connected to said previously mentioned elongated members that are linear; and all of said elongated members having the same uniform cross sectional shape.

18. A carriage according to claim 15, further including a permanently bent elongated member formed into a garment hangar extending below said drive shaft and being homogeneously connected to said previously mentioned elongated members, and all of said elongated members being of the same uniform cross sectional shape throughout their length.

19. A carriage according to claim 14, wherein said elongated member has a cross sectional shape and said driven roller has a skewed through aperture of a matching cross sectional shape; each of said driven rollers has a rotatable bearing surrounding said aperture for rotatably mounting said driven roller on said elongated member; and further including means for limiting axial movement of said driven roller on said elongated member.

20. A carriage according to claim 15, wherein each of said driven rollers includes a cylindrical outer peripheral portion for engaging said drive shaft, a central hub having therethrough a skewed aperture, and a rotatable bearing between said hub and said cylindrical outer peripheral portion.

* * * * *